(12) United States Patent
Wang et al.

(10) Patent No.: US 11,089,811 B2
(45) Date of Patent: Aug. 17, 2021

(54) DEVICE AND METHOD FOR PROCESSING GLUTEN PRODUCTS

(71) Applicant: CHANGSHA UNIVERSITY OF SCIENCE AND TECHNOLOGY, Hunan (CN)

(72) Inventors: Jianhui Wang, Hunan (CN); Zhimin Cheng, Hunan (CN); Dongmin Liu, Hunan (CN); Yan Wang, Hunan (CN); Shouyao Xiong, Hunan (CN); Jingheng Ning, Hunan (CN); Wen Li, Hunan (CN); Yongsheng Zhang, Hunan (CN); Zhiqiang Hu, Hunan (CN); Lei Yang, Hunan (CN); Yaru Sun, Hunan (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 0 days.

(21) Appl. No.: 17/038,130

(22) Filed: Sep. 30, 2020

(65) Prior Publication Data
US 2021/0007388 A1     Jan. 14, 2021

Related U.S. Application Data

(63) Continuation of application No. PCT/CN2020/083222, filed on Apr. 3, 2020.

(30) Foreign Application Priority Data

Apr. 18, 2019 (CN) .......................... 201910313964.4

(51) Int. Cl.
    *A23P 30/20*     (2016.01)
    *A23P 30/10*     (2016.01)
    *A23J 3/18*     (2006.01)

(52) U.S. Cl.
    CPC ................. *A23P 30/20* (2016.08); *A23J 3/18* (2013.01); *A23P 30/10* (2016.08)

(58) Field of Classification Search
CPC ....... A23P 30/20; A23P 30/10; B29C 48/0022
See application file for complete search history.

(56) References Cited

U.S. PATENT DOCUMENTS

| 3,797,069 | A | * | 3/1974 | Von Lersner | ........ | A22C 7/0015 425/377 |
| 9,750,261 | B1 | * | 9/2017 | Weller | .................. | A21C 11/16 |
| 2008/0102168 | A1 | | 5/2008 | Borders | | |

FOREIGN PATENT DOCUMENTS

| CN | 201663895 U | 12/2010 |
| CN | 105851456 A | 8/2016 |

(Continued)

*Primary Examiner* — Katherine D Leblanc

(57) ABSTRACT

A device for processing gluten products includes an extruder. A press forming mold that includes a fixed mold and a movable mold is provided at a discharge end of the extruder. A bowl is provided at an end surface of the fixed mold, and a bowl matched with the bowl of the fixed mold is provided at an end surface of the movable mold. A feeding channel is provided inside the fixed mold. A through hole is provided in the movable mold. An feed tube which is movable relative to the movable mold is arranged in the through hole. A die holder is arranged at the other end surface of the movable mold for holding the feed tube, and is movable with respect to the movable mold. A push-and-pull mechanism is provided at an end of the die holder.

10 Claims, 4 Drawing Sheets

(56) References Cited

FOREIGN PATENT DOCUMENTS

| | | |
|---|---|---|
| CN | 109170121 A | 1/2019 |
| CN | 110051024 A | 7/2019 |
| JP | 10323162 A | 12/1998 |

* cited by examiner

DEVICE AND METHOD FOR PROCESSING GLUTEN PRODUCTS

CROSS-REFERENCE TO RELATED APPLICATIONS

This application is a continuation of International Patent Application No. PCT/CN2020/083222, filed on Apr. 3, 2020, which claims the benefit of priority from Chinese Patent Application No. 201910313964.4, filed on Apr. 18, 2019. The content of the aforementioned applications, including any intervening amendments thereto, is incorporated herein by reference in its entirety.

TECHNICAL FIELD

The present disclosure relates to food processing technology, more particularly to a device and a method for processing gluten products.

BACKGROUND

Gluten, a plant protein, is a mixture of gliadins and glutenins. Wet gluten contains about 38% water and 60% protein, with a smooth surface, good elasticity and high toughness. Generally, the wet gluten is prepared by washing the flour under water, in which dough is placed in a basket or a sieve with dense pores or a coarse cloth, and the starch flows away with water. Finally, the protein that remains in the basket, the sieve or the coarse cloth form the wet gluten.

Among various products of gluten, the strip-shaped gluten is in the majority due to its mature production technology, by which the gluten is extruded by a bulking extruder, cut off in a certain length, mixed with ingredients and packed to be a final product. However, with the increase in living standards, the strip-shaped gluten products, such as spicy strips, cannot attract the consumer anymore due to their lack of novelty, which causes a decline in sales. Creatively, spherical gluten products are launched for stimulating demand. Nevertheless, the existing equipment cannot meet the processing requirements, and a device and a method for processing spherical gluten products are really in need.

SUMMARY

To solve the above-mentioned problems, the present application provides a device for processing gluten products, in which spherical gluten products with stuffing are formed by a movable mold and a fixed mold through fast press forming. The device has a simple structure, and is convenient to use. In addition, the device is novel in the market.

Meanwhile, the present disclosure further provides a method for processing gluten products using the device.

A device for processing gluten products, comprising an extruder;

wherein a press forming mold is provided at a discharge end of the extruder and comprises a fixed mold and a movable mold; the fixed mold is arranged at a discharge outlet of the extruder; a bowl is provided at an end surface of the fixed mold; a feeding channel is provided inside the fixed mold; the movable mold is movable along an extrusion direction of the extruder; a bowl matched with the bowl of the fixed mold is provided at an end surface of the movable mold;

a through hole is provided in the movable mold; an feed tube which is movable relative to the movable mold is arranged in the through hole; an end of the feed tube is inserted into the bowl of the movable mold, and the other end of the feed tube is in communication with an ingredient barrel through a pipe, and the pipe is provided with a metering pump; and a die holder is arranged at the other end surface of the movable mold for holding the feed tube, and the die holder is movable with respect to the movable mold; a push-and-pull mechanism is provided at an end of the die holder; a hold-down mechanism is provided on the movable mold and tightly connects the push-and-pull mechanism; and a stop block is arranged at a side surface of the movable mold.

In some embodiments, a passage communicated with the bowl of fixed mold is provided in the fixed mold; a ring groove communicated with the passage of the fixed mold is arranged at an outside of the fixed mold; a sleeve matched with the ring groove of the fixed mold is arranged at a periphery of the ring groove of the fixed mold; an inlet communicated with the ring groove of the fixed mold is provided at the sleeve of the fixed mold, and the inlet of the fixed mold is in communication with an oil tank.

In some embodiments, a passage communicated with the bowl of movable mold is provided in the movable mold; a ring groove communicated with the channel of the movable mold is arranged at an outside of the movable mold; a sleeve matched with the ring groove of the movable mold is arranged at a periphery of the ring groove of the movable mold; an inlet communicated with the ring groove of the movable mold is provided at the sleeve of the movable mold, and the inlet of the movable mold is in communication with the oil tank.

In some embodiments, an end of the feed tube, closed to the bowl of the movable mold, is of an outwardly tapered shape.

In some embodiments, a cross section of the feed tube is heart-shaped or star-shaped.

In some embodiments, the push-and-pull mechanism is an air cylinder.

In some embodiments, the hold-down mechanism comprises a threaded rod and a spring; an end of the threaded rod abuts against the movable mold passing through the die holder, and a nut is provided on the other end of the threaded rod; and the spring is sleeved on the threaded rod and is arranged between the nut and the die holder.

In some embodiments, a hopper is arranged below the press forming mold.

A method for processing gluten products using the device, comprising:

(A) pushing the movable mold forward by the push-and-pull mechanism to make it tightly contact with the fixed mold and align the bowl of the movable mold and the bowl of the fixed mold;

(B) extruding gluten by the extruder from the feeding channel of the fixed mold to a cavity formed by the bowl of the fixed mold and the bowl of the movable mold, and then fully filling the cavity with the gluten to obtain a gluten ball;

(C) pulling the die holder and the movable mold by the push-and-pull mechanism to separate the bowl of the fixed mold and the bowl of the movable mold, so that the gluten ball in which the feed tube is inserted is separated from the bowl of the fixed mold, in which the movable mold is stopped when it reaches the stop block, and the die holder continues to move to pull out the feed tube from the gluten ball; during the pulling out of the feed tube, turning on the metering pump to inject ingredients stored in the ingredient barrel to an inside of the gluten ball through the pipe and the feed tube; and after a period, turning off the metering pump to stop the injecting;

(D) stopping the push-and-pull mechanism when the gluten ball drops off from the bowl of the movable mold after pulling out the feed tube; and (E) repeating steps A to D.

In some embodiments, the step A further comprises:

coating a layer of oil on surfaces of the bowl of the fixed mold and the bowl of the movable mold.

The present invention has following beneficial effects.

In the present disclosure, spherical gluten products with stuffing are produced by a movable mold and a fixed mold through fast press forming. The device has a simple structure and is convenient to use. In addition, the device of the present disclosure is novel in the market.

One end of the feed tube, closed to the bowl of the movable mold, is of an outwardly tapered shape, that is the front end of the feed tube is larger than the back end of the feed tube, which provides enough force to separate gluten balls in which the feed tube is inserted, from the bowl of the fixed mold. Since the size of front end is larger than that of the back end, the feed tube will eject the stuck gluten balls to fall off when the next clamping of the molds comes.

A cross section of the feed tube is heart-shaped or star-shaped, which enables the gluten ball to have a hole of different shapes to meet consumers' demands for diversity of gluten products, thereby arousing consumers' desire for purchase.

Figure 1:
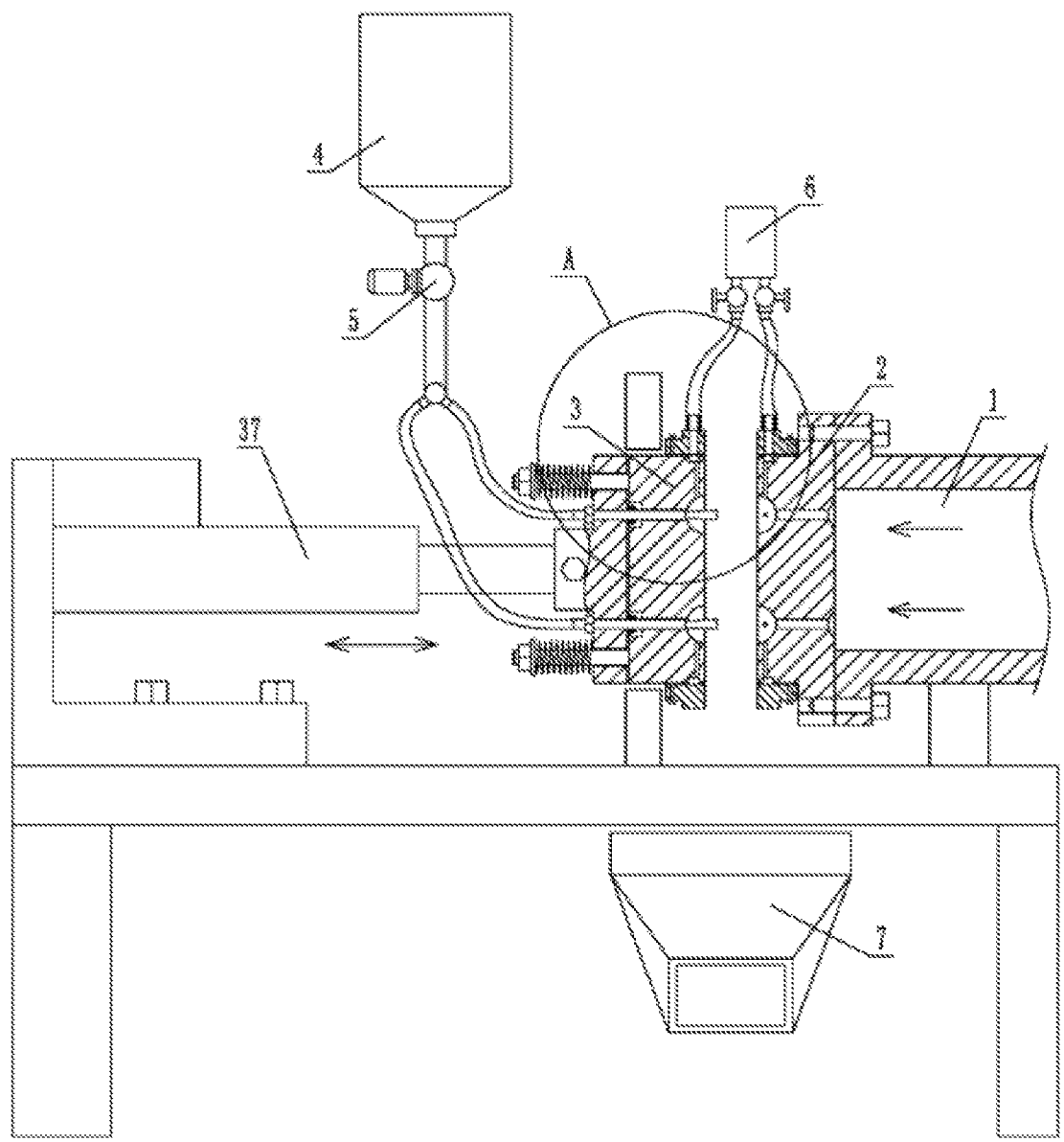
FIG. 1 is a front view of a device for processing gluten according to an embodiment of the present disclosure.

In the drawings: 1. extruder; 2. fixed mold; 21. bowl of fixed mold; 22. feeding channel; 23. passage of fixed mold; 24. ring groove of fixed mold; 25. sleeve of fixed mold; 3. movable mold; 301. passage of movable mold; 302. ring groove of movable mold; 303. sleeve of movable mold; 304. inlet of the movable mold; 31. bowl of movable mold; 32. through hole; 33. feed tube; 34. die holder; 35. threaded rod; 36. spring; 37. push-and-pull mechanism; 38. stop block; 39. hold-down mechanism; 4. ingredient barrel; 5. metering pump; 6. oil tank; 7. hopper.

DETAILED DESCRIPTION OF EMBODIMENTS

The present application is further described with reference to accompanying drawings to better illustrate technical solutions of the present application. The description in this part is only exemplary and illustrative, and is not intended to limit the scope of the present application.

Figure 2:
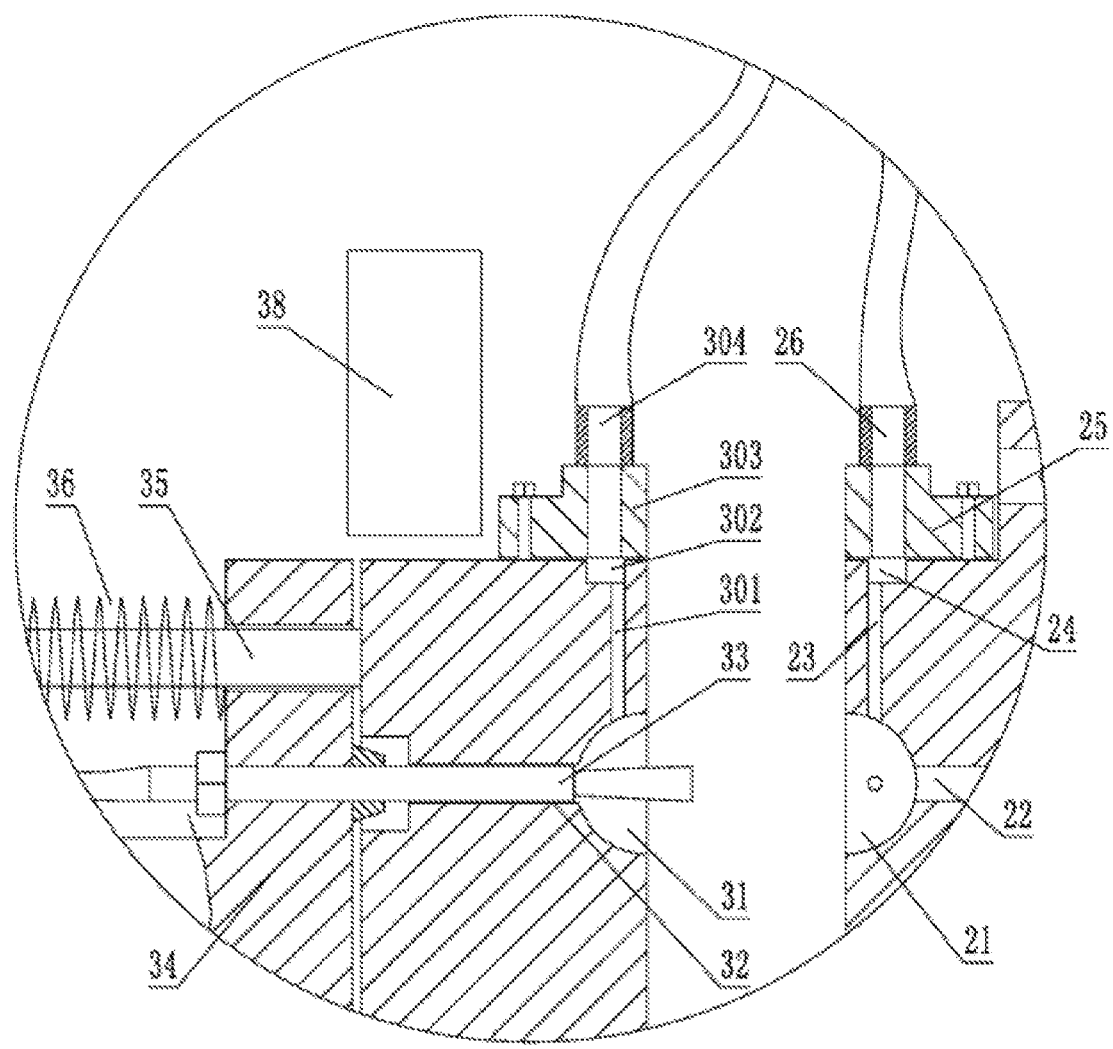
FIG. 2 is an enlarged view of portion A in FIG. 1.
Figure 3:
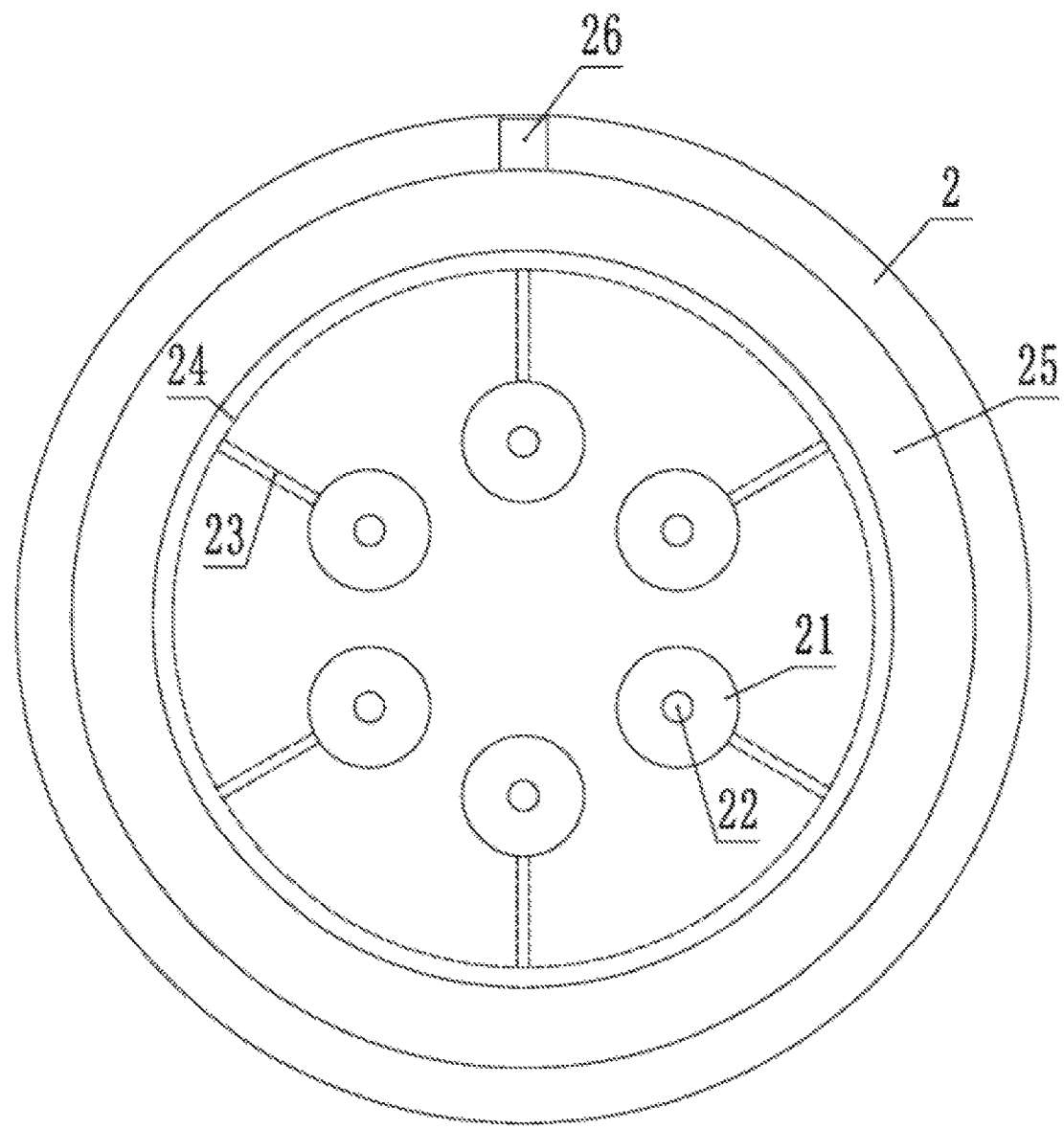
FIG. 3 is a side view of a fixed mold of the device for processing gluten according to an embodiment of the present disclosure.
Figure 4:
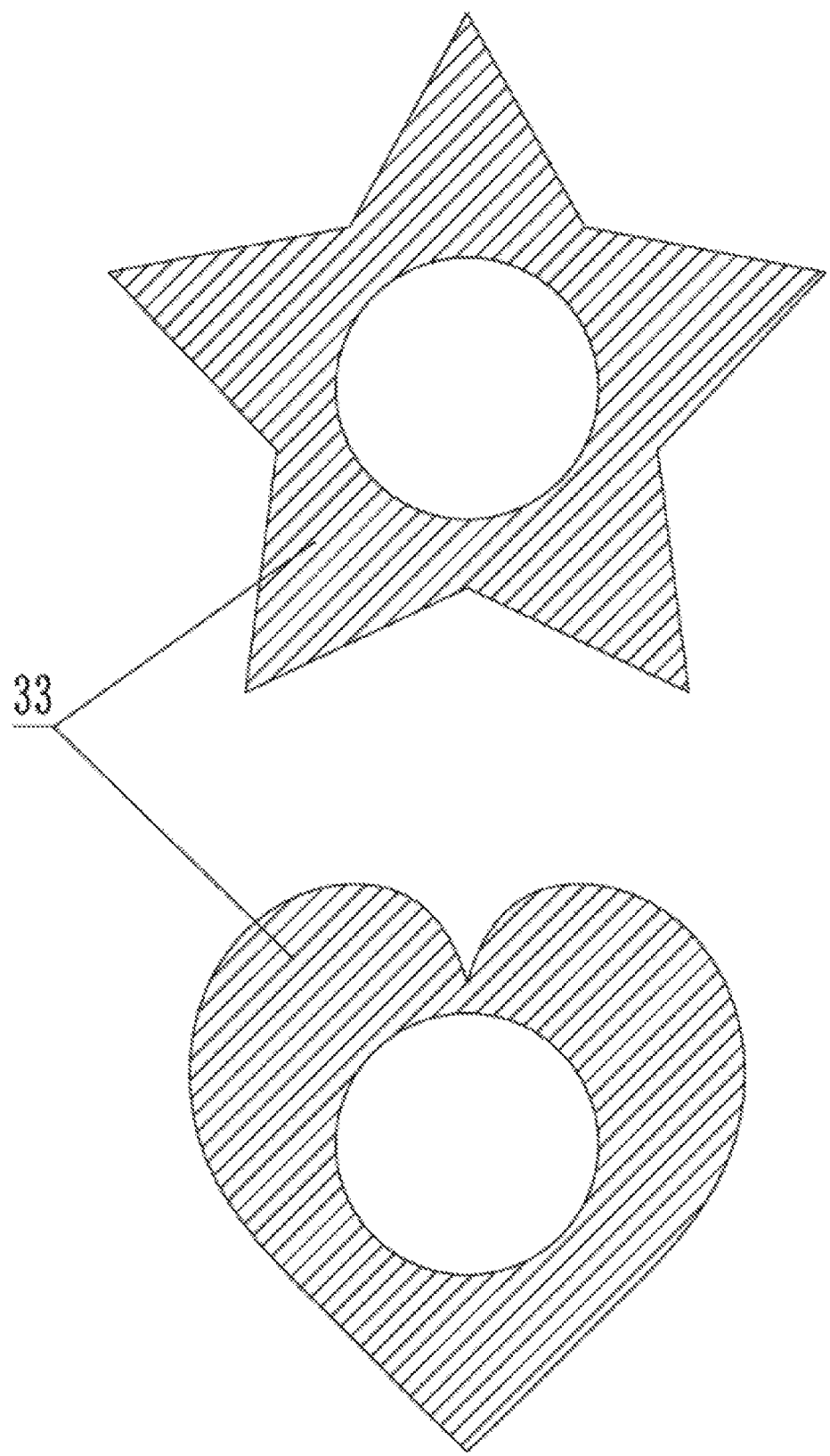
FIG. 4 is a cross section of an feed tube of the device for processing gluten according to an embodiment of the present disclosure.

As shown in FIGS. 1-4, this embodiment provides a device for processing gluten products, including an extruder 1. Prepared gluten is extruded by the extruder 1, and the extrusion may be continuous or discontinuous. A press forming mold is provided at a discharge end of the extruder and includes a fixed mold 2 and a movable mold 3. The fixed mold 2 is arranged at a discharge outlet of the extruder 1. A bowl 21 is provided at an end surface of the fixed mold 2. A feeding channel 22 is provided inside the fixed mold 2. The movable mold 3 is movable along an extrusion direction of the extruder (direction B in the FIG. 1).

A bowl 31 matched with the bowl 21 of the fixed mold is provided at an end surface of the movable mold 3. A through hole 32 is provided in the movable mold 3, and an feed tube 33 which is movable relative to the movable mold 3 is arranged in the through hole 32. An end of the feed tube 33 is inserted into the bowl 31 of the movable mold, and the other end of the feed tube 33 is in communication with an ingredient barrel 4 via a pipe provided with a metering pump 5. A die holder 34 is arranged at the other end surface of the movable mold 3 for holding the feed tube 33, and the die holder 34 is movable with respect to the movable mold 3. A push-and-pull mechanism 37 is provided at an end of the die holder 3, and a hold-down mechanism 39 is provided on the movable mold 3 and tightly connects the push-and-pull mechanism 39. A stop block 38 is arranged at a side of the movable mold 3.

In some embodiments, a passage 23 communicated with the bowl 21 of fixed mold is provided in the fixed mold 2, and the passage 23 is a narrow passage that just allows an immersion of oil. A ring groove 24 communicated with the passage 23 of the fixed mold is arranged at outside of the fixed mold 2, and a sleeve 25 matched with the ring groove 24 of the fixed mold is arranged at a periphery of the ring groove 24 of the fixed mold. An inlet 26 communicated with the ring groove 24 of the fixed mold is provided at the sleeve 25 of the fixed mold, and the inlet 26 of the fixed mold is in communication with an oil tank 6. In an embodiment, in order to prevent an outlet of the passage 23 of the fixed mold from being blocked, an oil pump is provided at a pipe that connects the inlet 26 of the fixed mold and the oil tank 6. Edible oil in the oil tank 6 flows into the bowl 21 of the fixed mold through the pipe, the inlet 26 of the fixed mold, the ring groove 24 of the fixed mold and the passage 23 of the fixed mold, so that an interior of the fixed mold bowl 21 is layered with the edible oil to prevent sticking of gluten.

In some embodiments, a passage 301 communicated with the bowl 31 of the movable mold is provided in the movable mold 3. A ring groove 302 communicated with the passage 301 of the movable mold is arranged at outside of the movable mold 3 and a sleeve 303 matched with the ring groove 302 of the movable mold is arranged at a periphery of the ring groove 302 of the movable mold. An inlet 304 communicated with the ring groove 302 of the movable mold is provided at the sleeve 303 of the movable mold, and the inlet 304 of the movable mold is in communication with an oil tank 6. Edible oil in the oil tank 6 flows into the bowl 31 of the movable mold through a pipe, the inlet 304 of the movable mold, the ring groove 302 of the movable mold and the passage 301 of the movable mold, so that an interior of the movable mold bowl 31 is layered with the edible oil to prevent sticking of gluten.

In some embodiments, an end of the feed tube 33, closed to the bowl 31 of the movable mold, is of an outwardly tapered shape, that is a front end of the feed tube 33 is larger than a rear end of the feed tube 33. This configuration provides enough force to separate the gluten ball into which the feed tube 33 is inserted, from the bowl 31 of the fixed mold. In addition, this configuration allows the feed tube 33 to push residues of the gluten ball that are stuck on the movable mold to drop off when the next clamping of the molds is performed.

In some embodiments, a cross section of the feed tube 33 is heart-shaped or star-shaped, and there is an injection channel inside the feed tube 23. The feed tube 33 enables the gluten ball to have a hole of different shapes to meet consumers' demands for diversity of gluten products, thereby arousing consumers' desire for purchase.

In some embodiments, the push-and-pull mechanism 37 is an air cylinder. The air cylinder has fast response, low lost and is convenient to mount.

In some embodiments, the hold-down mechanism 39 includes a threaded rod 35 and a spring 36. An end of the threaded rod 35 abuts against the movable mold 3 passing through the die holder 34, and the other end of the threaded rod 39 is provided with a nut. The spring 36 is sleeved on the threaded rod 35 and is arranged between the nut and the die holder 34.

In some embodiments, a hopper 7 is arranged below the press forming mold to collect gluten products.

A method for processing gluten products using the device, including the following steps.

(A) The movable mold 3 is pushed forward by the push-and-pull mechanism 37 to make it tightly contact with the fixed mold 3 and align the bowl 31 of the movable mold and the bowl 31 of the fixed mold.

(B) Gluten is extruded by the extruder 1 from the feeding channel 22 of the fixed mold to a cavity formed by the bowl 21 of the fixed mold and the bowl 31 of the movable mold, and then a gluten ball is obtained after the cavity is fully filled with the gluten.

(C) The push-and-pull mechanism 37 pulls the die holder 34 and the movable mold 3 to separate the bowl 21 of the fixed mold and the bowl 31 of the movable mold, so that the gluten ball on the feed tube 33 is separated from the bowl 21 of the fixed mold. When the movable mold 3 reaches the stop block 38, and the die holder 34 is continuously pulled by the push-and-pull mechanism 37 to slowly pull out the feed tube 33 from the spherical gluten. During the pulling out of the feed tube 33, the metering pump 5 is turned on to inject ingredients stored in the ingredient barrel 4 to an inside of the spherical gluten through the pipe and the feed tube 33; and after a period, the metering pump 5 is turned off to stop injecting.

(D) The feed tube 33 is pulled out of the gluten ball to allow the gluten ball to drop off from the bowl 31 of the movable mold, and the push-and-pull mechanism 37 is stopped to move.

(E) Steps A to D are repeated.

In some embodiments, in the step A, a layer of oil is coated on surfaces of the bowl 21 of the fixed mold and the bowl 31 of the movable mold.

In practical use, the movable mold 3 is pushed forward by the push-and-pull mechanism 37 to tightly contact with the fixed mold 3 and to align the bowl 31 of the movable mold and the bowl 31 of the fixed mold. The gluten is extruded by the extruder 1 from the feeding channel 22 of the fixed mold to a cavity formed by the bowl 21 of the fixed mold and the bowl 31 of the movable mold, and then the cavity is fully filled with the gluten to obtain a gluten ball.

Thereafter, the die holder 34 and the movable mold 3 are pulled by the push-and-pull mechanism 37 to separate the bowl 21 of the fixed mold and the bowl 31 of the movable mold, so that the gluten ball on the feed tube 33 is separated from the bowl 21 of the fixed mold. During the separation of the gluten ball from the bowl 21 of the fixed mold, since the gluten remained in the feeding channel has not been totally cooled and solidified, it is easy to separate the remained gluten from the gluten ball.

The movable mold 3 stops moving when it moves to the stop block 38, and the die holder 34 is still pulled by the push-and-pull mechanism 37 to slowly pull out the feed tube 33 from the gluten ball. During the pulling out of the feed tube 33, the metering pump 5 is turned on to inject ingredients stored in the ingredient barrel 4 to an inside of the gluten ball through the pipe and the feed tube 33. The ingredients are emulsion ingredients, such as apple flavor and taro flavor, which can be prepared according to the needs of consumers.

The ingredients, as a stuffing, give the gluten ball a better flavor, which satisfies the people's demand for better taste. After a period, the metering pump 5 is turned off to stop the injection. The feed tube 33 is slowly pulled out of the gluten ball to allow the gluten ball to drop off from the movable bowl 30 of the movable mold, and the push-and-pull mechanism is stopped. A layer of oil is coated on surfaces of the bowl 21 of the fixed mold and the bowl 31 of the movable mold before the extrusion to obtain a better drop-off effect of the gluten ball. If some gluten balls are stuck on the bowl 21 of the fixed mold, the feed tube 33 will eject the stuck gluten balls to fall off when the next clamping of the molds comes. The above-mentioned steps are repeated to produce more spherical gluten products with stuffing, which is novel in the market. The device has a simple structure, and is convenient to use.

It should be noted that terms such as "include" and "comprise" used herein are only intended to indicate the presence of steps, operations, devices and/or a combination thereof.

The embodiments described herein are intended to illustrate the principles of the present disclosure to help those skilled in the art better understand the technical solutions of the present disclosure. It should be noted that these embodiments are only the preferred embodiments of the present disclosure, and are not intended to limit the scope of the present disclosure. Any equivalent modifications based on the concept of the present invention and uses in all other related technical fields, shall fall within the protection scope of the present disclosure.

What is claimed is:

1. A device for processing gluten products, comprising an extruder;

wherein a press forming mold is provided at a discharge end of the extruder and comprises a fixed mold and a movable mold; the fixed mold is arranged at a discharge outlet of the extruder; a bowl is provided at an end surface of the fixed mold; a feeding channel is provided inside the fixed mold; the movable mold is movable along an extrusion direction of the extruder; a bowl matched with the bowl of the fixed mold is provided at an end surface of the movable mold;

a through hole is provided in the movable mold; a feed tube which is movable relative to the movable mold is arranged in the through hole; an end of the feed tube is inserted into the bowl of the movable mold, and the other end of the feed tube is in communication with an ingredient barrel through a pipe, and the pipe is provided with a metering pump; and a die holder is arranged at the other end surface of the movable mold for holding the feed tube, and the die holder is movable with respect to the movable mold; a push-and-pull mechanism is provided at an end of the die holder; a hold-down mechanism is provided on the movable mold and tightly connects the push-and-pull mechanism; and a stop block is arranged at a side surface of the movable mold.

2. The device of claim 1, wherein a passage communicated with the bowl of fixed mold is provided in the fixed mold; a ring groove communicated with the passage of the fixed mold is arranged outside the fixed mold; a sleeve matched with the ring groove of the fixed mold is arranged at a periphery of the ring groove of the fixed mold; an inlet communicated with the ring groove of the fixed mold is provided at the sleeve of the fixed mold, and the inlet of the fixed mold is in communication with an oil tank.

3. The device of claim 2, wherein a passage communicated with the bowl of movable mold is provided in the movable mold; a ring groove communicated with the passage of the movable mold is arranged at an outside of the movable mold; a sleeve matched with the ring groove of the movable mold is arranged at a periphery of the ring groove of the movable mold; an inlet communicated with the ring groove of the movable mold is provided at the sleeve of the movable mold, and the inlet of the movable mold is in communication with the oil tank.

4. The device of claim 1, wherein an end of the feed tube, inserted into the bowl of the movable mold, is of an outwardly tapered shape.

5. The device of claim 1, wherein a cross section of the feed tube is heart-shaped or star-shaped.

6. The device of claim 1, wherein the push-and-pull mechanism is an air cylinder.

7. The device of claim 1, wherein the hold-down mechanism comprises a threaded rod and a spring; an end of the threaded rod abuts against the movable mold passing through the die holder, and a nut is provided on the other end of the threaded rod; and the spring is sleeved on the threaded rod and is arranged between the nut and the die holder.

8. The device of claim 1, wherein a hopper is arranged below the press forming mold.

9. A method for processing gluten products using the device of claim 1, comprising:

(A) pushing the movable mold forward by the push-and-pull mechanism to make it tightly contact with the fixed mold and align the bowl of the movable mold and the bowl of the fixed mold;

(B) extruding gluten by the extruder from the feeding channel of the fixed mold to a cavity formed by the bowl of the fixed mold and the bowl of the movable mold, and then fully filling the cavity with the gluten to obtain a gluten ball;

(C) pulling the die holder and the movable mold by the push-and-pull mechanism to separate the bowl of the fixed mold and the bowl of the movable mold, so that the gluten ball in which the feed tube is inserted is separated from the bowl of the fixed mold, in which the movable mold is stopped when it reaches the stop block, and the die holder continues to move to pull out the feed tube from the gluten ball;

during the pulling out of the feed tube, turning on the metering pump to inject ingredients stored in the ingredient barrel to an inside of the gluten ball through the pipe and the feed tube; and after a period, turning off the metering pump to stop the injecting;

(D) stopping the push-and-pull mechanism when the gluten ball drops off from the bowl of the movable mold after pulling out the feed tube; and (E) repeating steps A to D.

10. The method of claim 9, wherein the step A further comprises:

coating a layer of oil on surfaces of the bowl of the fixed mold and the bowl of the movable mold.

* * * * *